United States Patent Office 2,889,761
Patented June 9, 1959

2,889,761

PHOTOGRAPHIC SHUTTER WITH INTERCHANGEABLE LENS

Kurt Gebele, Munich, Germany, assignor to Hans Deckel, Munich-Solln, Germany, and Friedrich Wilhelm Deckel, Zug, Switzerland Application May 31, 1955, Serial No. 512,189

Claims priority, application Germany May 31, 1954

6 Claims. (Cl. 95—64)

This invention relates to a photographic shutter, especially a shutter of the objective type intended for use with an interchangeable lens having an adjustable stop or iris diaphragm built into the lens mount.

An object of the invention is the provision of a generally improved and more satisfactory structure of this kind.

Another object is the provision of a shutter and interchangeable lens construction, so designed that the diaphragm of the lens and the speed setting or timing mechanism of the shutter may be coupled to each other in a variety of relative positions and thereafter may be moved together to vary the diaphragm aperture in a complementary manner to the shutter speed, and vice versa.

Still another object is the provision, in a photographic shutter of the objective type, of speed or time adjusting mechanism so designed that it may be coupled in a simple and effective manner to the diaphragm aperture adjusting mechanism of an associated lens structure which embodies an adjustable diaphragm.

A further object is the provision of an interchangeable lens structure of the type having an adjustable diaphragm built into the lens structure, the diaphragm aperture adjusting means being of such form that it may be adjustably coupled in an easy and simple manner with the shutter speed adjusting mechanism of a shutter with which the interchangeable lens is to be used.

Figure 1:
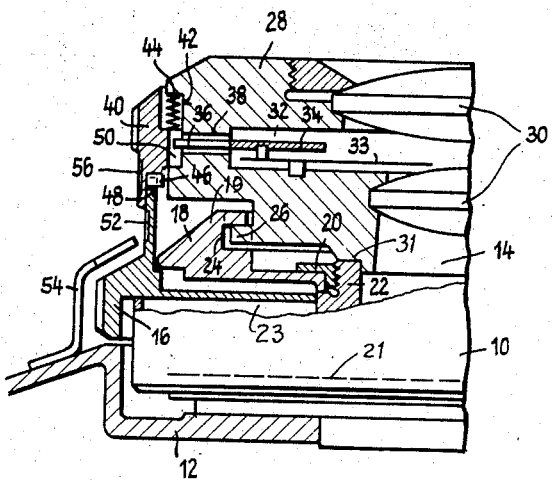
Figure 2:
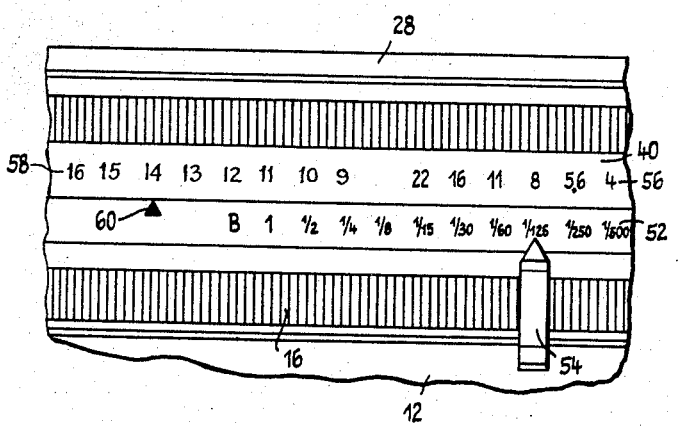

These and other desirable objects may be attained in the manner disclosed as an illustrative embodiment of the invention in the following description and in the accompanying drawings forming a part hereof, in which:

Fig. 1 is a fragmentary radial section taken axially through a shutter, associated parts of the camera on which the shutter is mounted, and an associated interchangeable lens structure, illustrating a preferred embodiment of the present invention; and Fig. 2 is a developed side view of the structure shown in Fig. 1, particularly illustrating the scales used in setting and adjusting the parts.

The same reference numerals throughout the several views indicate the same parts.

Referring now to the drawings and particularly to Fig. 1, there is shown at 10 a fragment of the housing or casing of an objective shutter secured in the usual way to the front portion 12 of the photographic camera with which the shutter is used. The central passageway or light admitting aperture of the shutter is defined by the forwardly extending tube 22, this passageway being normally closed by means of the usual series of movable shutter blades indicated diagrammatically by the broken line 21, lying in a plane perpendicular to the optical axis and driven in their opening and closing movements by suitable shutter operating mechanism located within the usual annular space of the shutter casing or housing, between the tube 22 and the outer cylindrical wall of the housing.

Except for the differences which will be apparent as the description proceeds, the shutter may be of any suitable known form of objective shutter, such for example as the form of shutter disclosed in Deckel and Geiger Patent 1,687,123, granted October 9, 1928. The front of the annular part of the shutter housing is closed by an annular front wall 18 surrounding the tube 22 (and corresponding in general to the front wall plate 141 of said Deckel and Geiger patent) and held in place by an overlying retaining ring 20 screwed on external threads at the front end of the tube 22. Unlike the comparatively flat front plate 141 of said Deckel and Geiger patent, however, the present front plate 18 of the shutter is formed with a part which projects forwardly at 19, either in a continuous ring concentric with the optical axis of the shutter, or at suitable intervals spaced in a circumferential direction, and this forwardly projecting flange or part 19 is formed with bayonet slots 24 to receive and detachably retain the bayonet lug 26 on an interchangeable lens mount designed to be used with the shutter, as further explained below.

As usual in modern objective shutters, the operating or driving mechanism of the shutter blades 21 may be driven at various speeds in order to vary the duration of the photographic exposure. The timing mechanism or retarding mechanism which controls the duration of exposure is adjusted and controlled by the exposure adjusting ring 16 having a transverse or radially extending flange which is rotatable on the outer periphery of the tube 22 near the front of the shutter, behind the front plate 18. At the outer edge of this radial flange is an approximately cylindrical forwardly extending flange, and a generally cylindrical and thickened rearwardly extending flange of somewhat larger diameter, the outer periphery of which is serrated or milled as shown, for easier grasping and turning. In function and operation, this time adjusting ring 16 may correspond, for example, to the time adjusting ring 63 of said Deckel and Geiger patent, although the cross sectional shape of the ring in the present instance is different from that of the ring in the patent, as will be seen by comparing Fig. 1 of this application with Fig. 13 of the patent.

In many photographic shutters of the objective type, the lens is mounted permanently in the shutter. When the shutter is used with a high grade camera, however, it is desirable to be able to employ alternatively different kinds or types of lenses, e.g., a regular or ordinary lens, a wide angle lens, and one or more telephoto lenses. The present invention relates particularly to a shutter intended for use with interchangeable lenses, rather than one having a permanent built-in lens.

When different interchangeable lenses are used, they will differ from each other in focal length and other characteristics, and of course the mounts or housings of the lens structures will differ in size and length, depending upon the focal length and other characteristics of the lens contained in the housing or mount. But in any case, regardless of differences in size and shape, the lens mount will include a main body, a typical form of which is here indicated at 28, containing the lens components or elements 30 suitably retained in the mount. The rear end of the mount is of ring-like form having a rearwardly projecting flange 31 which fits snugly against the front edge of the tube 22 of the shutter, and having radially extending bayonet lugs 26 intended to mate with the bayonet slots 24 at the front of the shutter housing, the lens structure and the shutter being detachably engaged with each other by an axial movement toward each other, followed by a slight rotational movement to bring the bayonet lugs 26 under the overhanging part of the bayonet slots 24. The parts are disengaged by a reverse rotational movement to bring the bayonet lugs 26 out from under the overhanging parts of the bayonet slots 24, whereupon the lens mount and the shutter may be moved axially away from each other. In this way, one lens structure may be removed from the shutter and a different lens structure may be placed thereon.

The lens mount contains a transversely extending cavity 32 at an intermediate point in the length of the mount, which cavity contains the familiar series of overlapping iris diaphragm leaves or blades 33, adjustable to various positions to vary the size of the diaphragm aperture or stop, by turning a ring 34 rotatable about the optical axis of the lens structure and pivotally connected to each blade as shown. At one point on the periphery of the diaphragm adjusting ring 34 there is a radial arm 36 which extends outward through a radial slot 38 in the lens mount, the slot being sufficiently long in a circumferential direction so that the arm 36 has freedom of circumferential movement to adjust the diaphragm from the smallest to the largest aperture.

In applicant's copending U.S. patent application filed November 2, 1953, Serial No. 389,775, (now Patent 2,829,574, issued April 8, 1958), applicant has pointed out the advantages of coupling the speed setting member of a photographic shutter to the diaphragm aperture adjusting member of the shutter, and the advantages of using a light value scale or integrated exposure value scale for showing the relative relationship or orientation of the shutter speed adjusting means to the diaphragm aperture adjusting means at any given moment, regardless of the absolute values of shutter speed or diaphragm aperture. The present application shows how the inventive concept may be carried another step forward, in order to couple a shutter speed setting member of a photographic shutter with a diaphragm aperture setting or adjusting member on a separate interchangeable lens structure which is removable from and replaceable on the shutter, and in order to enable the use of the same advantageous light value scale or integrated exposure value scale as disclosed in said copending application.

According to the present invention, the interchangeable lens mount 28 is provided with a circumferentially extending ring 40 rotatable on the periphery of the mount, and overlapping or lying across the plane of the arm 36 of the diaphragm adjusting ring 34. This ring 40 is preferably milled or serrated around its periphery, as shown, to enable it more readily to be grasped and turned by the operator's fingers. It is not only rotatable circumferentially, but also displaceable axially on a cylindrical part 42 of the mount 28, the extent of axial movement being limited by radial flanges or shoulders at the front and back of the cylindrical part 42. A few compression springs 44, spaced at intervals around the periphery of the cylindrical part 42, press rearwardly against the adjusting ring 40 and thus tend constantly to shift it axially to its rearward limit of motion, although it can be displaced forwardly by application of slight force sufficient to overcome the springs 44.

At one point in its periphery, the ring 40 has a rearwardly extending tooth 46 which may be engaged in any one of a series of coupling notches 48 formed in the front edge of the shutter speed adjusting ring 16. This arrangement couples the ring 40 to the ring 16, so that when either ring is turned, the other will turn with it, except when the ring 40 is displaced forwardly to uncouple the tooth from the notches. Also, at one point the inner face of the ring 40 is provided with an axial slot 50 engaging and embracing the outer end of the radial arm 36 on the diaphragm adjusting ring 34, thereby permanently coupling the ring 40 to the ring 34 so that any rotary movement imparted to the ring 40 will be transmitted through the parts 50 and 36 to the ring 34, and will result in adjusting the diaphragm aperture in one direction or the other.

The outer periphery of the forwardly extending flange of the shutter speed adjusting ring 16 is provided with graduations 52 read in conjunction with a fixed pointer or reference mark 54 mounted either on the shutter casing 10 or, preferably, on the camera body 12, the graduations indicating various shutter speeds or exposure durations for which the shutter operating mechanism is set when the ring 16 is turned to bring any particular one of the graduations 52 opposite the pointer or reference mark 54. In the example shown in Fig. 2, one graduation "B" indicates a bulb exposure, and there are other graduations for various "snap-shot" or "instantaneous" shutter speeds from one second to $\frac{1}{500}$ of a second. The successive graduations are arranged substantially in a geometric progression so that, in one direction, each shutter speed graduation corresponds to an exposure having a duration approximately one-half the length of the exposure effected when the adjusting ring is set at the next preceding graduation for longer or slower exposures.

The diaphragm adjusting ring 40 of the lens structure is provided with a rearwardly extending cylindrical flange which slightly overlaps and overlies the forward edge of the flange of the speed adjusting member 16. This rearwardly extending flange of the member 40 is provided with graduations 56 which, when read in conjunction with the same index mark or pointer 54, will show the size of the diaphragm aperture to which the iris diaphragm blades 33 are set at any given moment, the graduations 56 preferably begin in terms of $f$ number. According to the present invention, these graduations are arranged complementary to the shutter speed graduations 52, and successive graduations 56 are spaced at the same spacing as the shutter speed graduations 52, so that when the diaphragm aperture is adjusted to the extent of one graduation in a smaller direction, a corresponding turning of the shutter speed adjusting member 16 in the same direction to the same amount will adjust the shutter for a slower exposure by an amount sufficient to compensate for the smaller aperture, and vice versa.

On another part of the periphery of the same rearwardly extending flange of the member 40, there is a light value scale or integrated exposure value scale 58, read in conjunction with a reference point or index mark 60 on the forwardly extending flange of the shutter speed adjusting ring 16. Successive graduations on the scale 58 are spaced circumferentially at the same intervals as the successive graduations of the respective scales 52 and 56. By reading the scale 58 in conjunction with the reference point 60, the relative orientation of the adjusting members 16 and 40 at any given time can be determined, regardless of the absolute values for which the diaphragm aperture or the shutter speed may happen to be set at the moment.

If it is desired to set the parts for a higher integrated exposure value, as for example when the illumination of a subject has increased since the last exposure was made, or when a film of faster speed is to be used, the ring 40 on the lens mount is grasped and displaced forwardly against the slight force of the springs 44, and is turned to the right when viewed as in Fig. 2 (counter-clockwise when viewed from the front of the lens and shutter, or clockwise when viewed from behind the camera) to the desired position, thus closing down the diaphragm aperture to a smaller $f$ number, without affecting the shutter speed. Then, upon release of the forward pressure on the ring 40, the springs 44 will return the ring rearwardly to engage the tooth 46 in the appropriate coupling notch 48 which now lies opposite the tooth. Thereafter, turning force may be applied either to the ring 40 or to the ring 16, and both rings will turn conjointly or together, to make the diaphragm aperture larger and the exposure shorter in a complementary manner, or to make the diaphragm aperture smaller and the exposure longer, as may be desired by the photographer.

When the integrated exposure value changes, due to change in illumination conditions, or change in the film which is to be used, or use of a filter requiring a different filter factor, then the ring 40 is again pulled forwardly to uncouple it from the ring 16, is turned to the new desired position, and is allowed to spring rearwardly again to resume the coupling relationship between the two rings 40 and 16.

When the lens structure is to be removed from the shutter to enable a different lens structure to be applied to the shutter, the ring 40 may be pulled forwardly to uncouple it from the ring 16, if desired, although this is not necessary. If the lens mount 28 is rotated relative to the shutter through the small extent necessary to disengage the bayonet lugs 26 from the bayonet slots 24, such rotary motion may result in some rotation of the ring 40 relative to the mount 28 if the ring is coupled at that time to the ring 16, but this will be of no importance. Similarly, when a different lens mount is applied to the shutter, the slight rotary motion during engagement of the bayonet connection may cause a turning of one or the other of the rings 16, but again this is of no importance, because the ring 40 is readily adjusted to proper position of orientation relative to the ring 16, after the mounting of the lens structure on the shutter has been completed.

If desired, the scale 58 and pointer 60 may be reversed; that is, the pointer or reference mark 60 may be placed on the ring 40 while the integrated exposure value scale 58 may be placed on the ring 16. Also, the coupling tooth 46 may be placed on the ring 16 instead of on the ring 40, in which case the coupling notches 48 would be formed on the ring 40 instead of the ring 16.

It is seen from the foregoing disclosure that the above mentioned objects of the invention are well fulfilled. It is to be understood that the foregoing disclosure is given by way of illustrative example only, rather than by way of limitation, and that without departing from the scope of the invention, the details may be varied within the scope of the appended claims.

What is claimed is:

1. The combination with an objective photographic shutter having an approximately annular housing and a speed adjusting ring rotatably mounted on said housing, said ring including a forwardly projecting flange, of an interchangeable lens structure having a lens mount adapted to be detachably connected to the front of said shutter housing, an iris diaphragm contained within said lens mount, a diaphragm adjusting ring rotatable on said lens mount for adjusting the aperture of said diaphragm and also displaceable axially on said mount, said diaphragm adjusting ring including a rearwardly projecting flange adapted to lie close to said forwardly projecting flange of said speed adjusting ring when said lens mount is attached to said shutter housing in normal operative position thereon, a series of notches in one of said flanges, a coupling tooth on the other of said flanges, said coupling tooth being adapted to enter a selected one of said notches when said diaphragm adjusting ring is moved axially rearwardly toward said shutter housing and adapted to be removed from such notch when said diaphragm adjusting ring is moved axially forwardly away from said shutter housing, and a spring tending to move said diaphragm adjusting ring rearwardly to keep said tooth in the selected one of said notches, thereby to couple said two adjusting rings for conjoint rotary movement.

2. A construction as defined in claim 1, in which one of said flanges overlaps the other of said flanges in coaxial telescopic relation thereto when said lens mount is attached to said shutter housing in normal operative position thereon.

3. A construction as defined in claim 1, further including an index mark on one of said adjusting rings and a graduated scale on the other of said adjusting rings for indicating, by reference to said index mark, the relative position of orientation of said two rings with respect to each other, independently of the absolute position of either one.

4. A construction as defined in claim 3, further including a graduated scale of shutter speeds on said speed adjusting ring, a graduated scale of diaphragm apertures on said diaphragm adjusting ring, and a single pointer mounted in fixed relation to said shutter housing for cooperating with both of said two last-mentioned scales.

5. A construction as defined in claim 1, further including gripping serrations on at least one of said adjusting rings.

6. The combination with an objective photographic shutter including a housing, of an interchangeable lens mount, cooperating interengaging means on said housing and mount for securing said mount detachably to the front of said housing, a shutter speed adjusting member movably mounted on said housing, a diaphragm aperture adjusting member movably mounted on said lens mount, and coupling means effective when said lens mount is secured in operative position on said shutter housing for adjustably coupling said speed adjusting member to said aperture adjusting member in any selected one of a series of positions of orientation with respect to each other, so that adjusting movement of one of said adjusting members will cause corresponding adjusting movement of the other of said adjusting members, said coupling means being so constructed as to be automatically engaged by axial movement of said lens mount toward said shutter housing when said lens mount is being secured to said shutter housing and automatically disengaged by axial movement of said lens mount away from said shutter housing when being detached therefrom.

References Cited in the file of this patent

UNITED STATES PATENTS

| 1,422,460 | Marks | July 11, 1922 |
| 1,623,998 | Cooke | Apr. 12, 1927 |
| 2,328,157 | Luneburg | Aug. 31, 1943 |
| 2,384,615 | Fuerst | Sept. 11, 1945 |
| 2,590,161 | Dorsey | Mar. 25, 1952 |
| 2,596,328 | Dorsey | May 13, 1952 |
| 2,649,024 | Goldhamer | Aug. 18, 1953 |
| 2,716,930 | Marson | Sept. 6, 1955 |

FOREIGN PATENTS

| 854,199 | France | Mar 12, 1940 |
| 1,028,877 | France | Mar. 4, 1953 |
| 1,090,214 | France | Oct. 13, 1954 |
| 1,091,432 | France | Oct. 27, 1954 |